United States Patent
Manchanda et al.

(10) Patent No.: US 11,443,538 B2
(45) Date of Patent: Sep. 13, 2022

(54) SYSTEM AND METHOD FOR MACHINE ASSISTED DOCUMENTATION IN MEDICAL WRITING

(71) Applicant: Tata Consultancy Services Limited, Mumbai (IN)

(72) Inventors: Sanjeev Manchanda, Mumbai (IN); Ashish Indani, Mumbai (IN); Mahesh Kshirsagar, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 113 days.

(21) Appl. No.: 17/036,005

(22) Filed: Sep. 29, 2020

(65) Prior Publication Data

US 2021/0117670 A1   Apr. 22, 2021

(30) Foreign Application Priority Data

Oct. 16, 2019   (IN) .............................. 201921041908

(51) Int. Cl.
*G06F 17/00* (2019.01)
*G06V 30/416* (2022.01)
*G06F 40/295* (2020.01)
*G06F 40/226* (2020.01)
*G06V 30/414* (2022.01)

(52) U.S. Cl.
CPC .......... *G06V 30/416* (2022.01); *G06F 40/226* (2020.01); *G06F 40/295* (2020.01); *G06V 30/414* (2022.01)

(58) Field of Classification Search
CPC .. G06V 30/416; G06V 30/414; G06F 40/226; G06F 40/295
See application file for complete search history.

(56) References Cited

U.S. PATENT DOCUMENTS

| | | |
|---|---|---|
| 7,321,861 B1 | 1/2008 | Oon |
| 7,490,085 B2 | 2/2009 | Walker et al. |

(Continued)

OTHER PUBLICATIONS

Lorenzetti, Diane L., et al. "Strategies for improving physician documentation in the emergency department: a systematic review." BMC emergency medicine 18.1 (2018): 1-12 (Year: 2018).*

(Continued)

*Primary Examiner* — Andrew T McIntosh
(74) *Attorney, Agent, or Firm* — Finnegan, Henderson, Farabow, Garrett & Dunner LLP

(57) ABSTRACT

In medical writing, manual process of creating, updating and maintaining documents is expensive, time consuming. This disclosure provides a method of an automatic medical document writing by receiving, a plurality of input documents as an input; processing, the inputted plurality of documents by extracting into an at least one section to generate a list of sections; classifying, at least one category corresponding to the at least one section to generate a summary set; generating, at least one of a local context and a global context based on the summary set; parsing, at least one sentence based on the generated local context and global context to generate at least one sequence of the plurality of sentences; processing, the at least one sequence of the plurality of sentence to generate a queue of the at least one sequence; validating, the queue of the at least one sequence to obtain a combined summary set.

15 Claims, 10 Drawing Sheets

(56) References Cited

U.S. PATENT DOCUMENTS

| | | |
|---|---|---|
| 8,930,178 B2 | 1/2015 | Pestian et al. |
| 2009/0119095 A1 | 5/2009 | Beggelman et al. |
| 2010/0131498 A1 | 5/2010 | Linthicum et al. |
| 2018/0018966 A1* | 1/2018 | Leonard .................. G06N 5/022 |
| 2018/0101599 A1* | 4/2018 | Arnold .................. G06F 16/338 |
| 2021/0042383 A1* | 2/2021 | Feigenblat ............... G06N 3/04 |

OTHER PUBLICATIONS

Author: Abhishek Kumar Singh, Manish Gupta Title: Neural Approaches Towards Text Summarization Title of the item: Computer Science Date: 2018 Publisher: Semantic Scholar Link: http://web2py.iiit.ac.in/research_centres/publications/download/mastersthesis.pdf.a22c5b2fc4cce9bd.4e657572616c20417070726f616368657320546f776172647320546578742053756d6172697a6174696f6e2028416268697368656b204b756d61722053696e67682c204d532c203230313530373533139292e706466.pdf.

* cited by examiner

SYSTEM AND METHOD FOR MACHINE ASSISTED DOCUMENTATION IN MEDICAL WRITING

PRIORITY CLAIM

This U.S. patent application claims priority under 35 U.S.C. § 119 to: India Application No. 201921041908, filed on 16 Oct. 2019. The entire contents of the aforementioned application are incorporated herein by reference.

TECHNICAL FIELD

This disclosure relates generally relates to data management system, and, more particularly, to system and method for machine assisted documentation in medical writing.

BACKGROUND

During clinical trials process, many documents are prepared i.e. starting from protocol to clinical study report etc. Medical writing requires special skill to produce well-structured documents that present information clearly and concisely, but manual process of creating, updating and maintaining these documents is expensive and time consuming. One of biggest challenge is lack of standardization for the medical writing. In present scenario, unavailability of any standard corpus for training of algorithms in especially in pharmaceutical domain, that is corpus need to be prepared from scratch. The pharmaceutical industry is highly compliance driven regulated industry, output of system must be compliant to different regulations.

SUMMARY

Embodiments of the present disclosure present technological improvements as solutions to one or more of the above-mentioned technical problems recognized by the inventors in conventional systems. For example, in one aspect, a processor implemented method a machine assisted documentation in a medical writing is provided. The processor implemented method includes at least one of: receiving, via one or more hardware processors, a plurality of input documents as an input for different type of documents to be created; processing, via the one or more hardware processors, the inputted plurality of documents by extracting into an at least one section to generate a list of sections; classifying, via the one or more hardware processors, at least one category corresponding to the at least one section to generate a summary set; generating, via the one or more hardware processors, at least one of (i) a local context, (ii) a global context, and combination thereof based on the summary set; parsing, via the one or more hardware processors, at least one sentence based on the generated local context, or global context to generate at least one sequence of the plurality of sentences; processing, via the one or more hardware processors, the at least one sequence of the plurality of sentence to generate a queue of the at least one sequence; and validating, via the one or more hardware processors, the queue of the at least one sequence to obtain a combined summary set. In an embodiment, the at least one category corresponds to a Summarizable category. In an embodiment, the summary set comprises a plurality of sentences.

In an embodiment, the plurality of logical categories may correspond to at least one of (i) a Summarizable sections, (ii) brief summaries, and (iii) text sections excluded. In an embodiment, the Summarizable Sections category may include at least one section of (i) introduction, (ii) problem statement, (iii) research methodology, and (iv) experimentation with associated results. In an embodiment, the brief summaries category may include at least one section of (i) abstract, and (ii) conclusion. In an embodiment, the text sections excluded category may include at least one section of (i) historical background, (ii) references, and (iii) appendix. In an embodiment, the local context may include at least one of (i) overall context of the input documents, (ii) an extracted context of a plurality of referenced documents or combination thereof.

In another aspect, there is provided a processor implemented system for a machine assisted documentation in a medical writing is provided. The system comprises a memory storing instructions; one or more communication interfaces; and one or more hardware processors coupled to the memory via the one or more communication interfaces, wherein the one or more hardware processors are configured by the instructions to: receive, a plurality of input documents as an input for different type of documents to be created; process, the inputted plurality of documents by extracting into an at least one section to generate a list of sections; classify, at least one category corresponding to the at least one section to generate a summary set; generate, at least one of (i) a local context, (ii) a global context, and combination thereof based on the summary set; parse, at least one sentence based on the generated local context, or global context to generate at least one sequence of the plurality of sentences; process, the at least one sequence of the plurality of sentence to generate a queue of the at least one sequence; and validate, the queue of the at least one sequence to obtain a combined summary set. In an embodiment, the at least one category corresponds to a Summarizable category. In an embodiment, the summary set comprises a plurality of sentences.

In an embodiment, the plurality of logical categories may correspond to at least one of (i) a Summarizable sections, (ii) brief summaries, and (iii) text sections excluded. In an embodiment, the Summarizable Sections category may include at least one section of (i) introduction, (ii) problem statement, (iii) research methodology, and (iv) experimentation with associated results. In an embodiment, the brief summaries category may include at least one section of (i) abstract, and (ii) conclusion. In an embodiment, the text sections excluded category may include at least one section of (i) historical background, (ii) references, and (iii) appendix. In an embodiment, the local context may include at least one of (i) overall context of the input documents, (ii) an extracted context of a plurality of referenced documents or combination thereof.

In yet another aspect, there are provided one or more non-transitory machine readable information storage mediums comprising one or more instructions which when executed by one or more hardware processors causes at least one of: receiving, via one or more hardware processors, a plurality of input documents as an input for different type of documents to be created; processing, via the one or more hardware processors, the inputted plurality of documents by extracting into an at least one section to generate a list of sections; classifying, via the one or more hardware processors, at least one category corresponding to the at least one section to generate a summary set; generating, via the one or more hardware processors, at least one of (i) a local context, (ii) a global context, and combination thereof based on the summary set; parsing, via the one or more hardware processors, at least one sentence based on the generated local context, or global context to generate at least one sequence of the plurality of sentences; processing, via the one or more hardware processors, the at least one sequence of the plurality of sentence to generate a queue of the at least one sequence; and validating, via the one or more hardware processors, the queue of the at least one sequence to obtain a combined summary set. In an embodiment, the at least one category corresponds to a Summarizable category. In an embodiment, the summary set comprises a plurality of sentences.

In an embodiment, the plurality of logical categories may correspond to at least one of (i) a Summarizable sections, (ii) brief summaries, and (iii) text sections excluded. In an embodiment, the Summarizable Sections category may include at least one section of (i) introduction, (ii) problem statement, (iii) research methodology, and (iv) experimentation with associated results. In an embodiment, the brief summaries category may include at least one section of (i) abstract, and (ii) conclusion. In an embodiment, the text sections excluded category may include at least one section of (i) historical background, (ii) references, and (iii) appendix. In an embodiment, the local context may include at least one of (i) overall context of the input documents, (ii) an extracted context of a plurality of referenced documents or combination thereof.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1A:
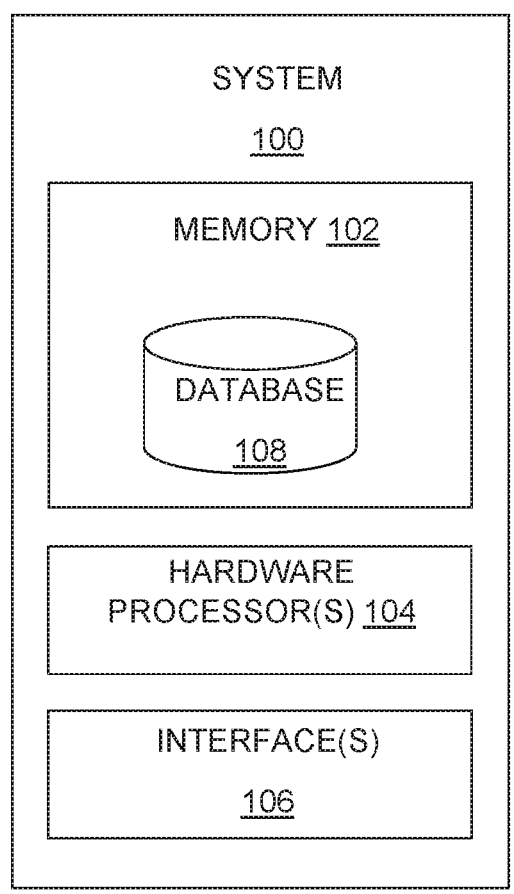
FIG. 1A illustrates a functional block diagram of automation of a medical writing, according to embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1A illustrates a functional block diagram of medical writing automation system, according to embodiments of the present disclosure. In an embodiment, the system 100 includes one or more hardware processors 104, one or more interfaces 106 (e.g., communication interface device(s) or input/output (I/O) interface(s)), and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules and a repository for storing data processed, received, and generated by the plurality of modules. The plurality of modules may include routines, programs, objects, components, data structures, and so on, which perform particular tasks or implement particular abstract data types.

Further, the database 108 stores information pertaining to inputs fed to the system 100 and/or outputs generated by the system 100 (e.g., data/output generated at each stage of the data processing), specific to the methodology described herein. More specifically, the database 108 stores information being processed at each step of the proposed methodology.

The repository, amongst other things, includes a system database and other data. The other data may include data generated as a result of the execution of one or more modules in the plurality of modules.

Figure 1B:
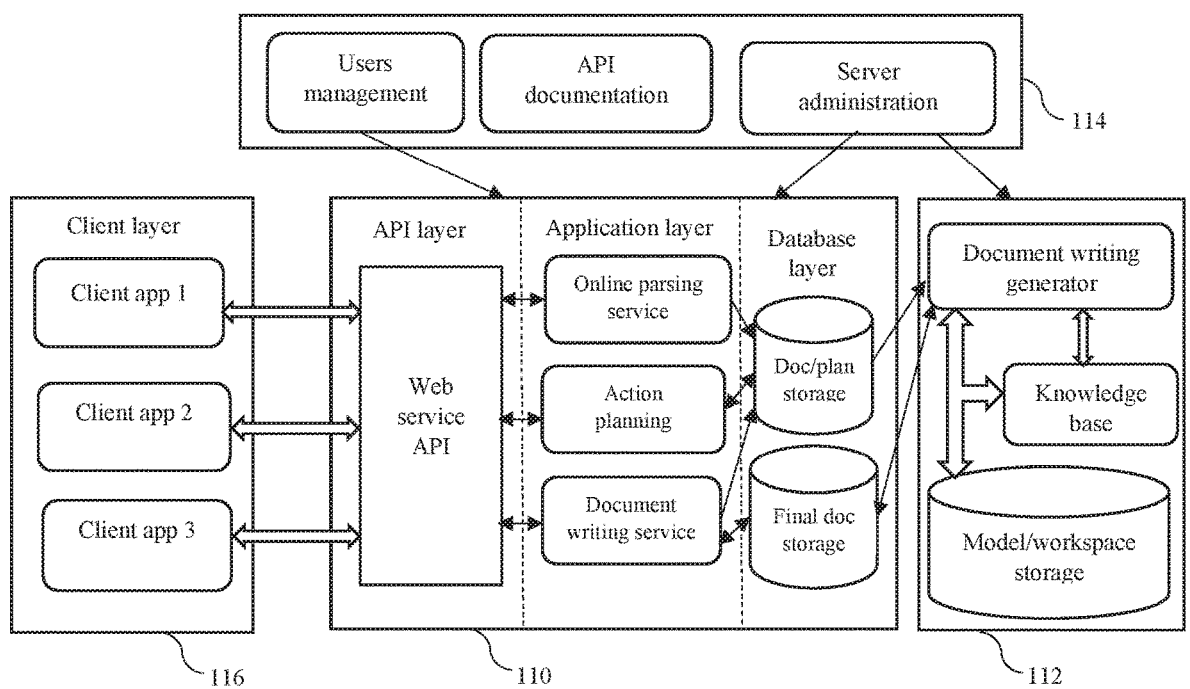
FIG. 1B illustrates an exemplary architecture of a medical writing automation system, according to some embodiments of the present disclosure.

FIG. 1B illustrates an exemplary architecture of the medical writing automation system according to some embodiments of the present disclosure. The medical writing automation system includes an application server module 110, a server module 112, an administrative module 114, and a plurality of client devices module 116. The application server module 110 is configured for at least one of (i) receiving requests from one or more users, (ii) accepting one or more input documents, (iii) parsing documents, (iv) storing intermediate results, (v) facilitates interactions with domain experts, (vi) maintaining versioning of connecting the server module 112 for final summarization and responding back to the one or more users with results. The application server module 110 includes an application server API layer, an application layer, and a database layer. The application server API layer facilitates connectivity to one or more users for accessing application for uploading one or more inputs and generating one or more outputs. The one or more input documents uploaded by the one or more users are passed to the application layer for further processing. The application layer includes online parser service, action planning service and document writing service. The online parsing service receives one or more input documents and parses them into one or more sections or one or more paragraphs. The action planning further divides the one or more sections or the one or more paragraphs into different categories of sections and paragraphs.

In an embodiment, at least one of input document(s), sections/paragraphs with categories details, and action plans for generating summaries are stored into a storage doc/plan storage database in the database layer. In an embodiment, after finalizing content summarization plan, the action planning service sends a request to the server module 112 for generating final summary. After generating the summary, the server module 112 returns summary to doc writing service for printing final output document. In an embodiment, contents of one or more output documents are stored in a final doc storage repository of the database layer and responds back to one or more users through a web service API with one or more output documents. The database layer includes one or more repositories viz. a document/plan storage and a final document storage.

The server module 112 include a doc writing generator, a knowledge base and a model/workspace storage. The doc writing generator receives one or more input sections or one or more paragraphs from the application server and processes further based sections based on a natural language processing through an enhanced algorithm for generating output summary. The doc writing generator utilize a knowledge base for local as well as global contexts with a language model for processing of one or more natural language inputs. The server module 112 is configured to perform a document summarization as per validated plan. For example, the server module 112 utilize an artificial intelligence/a machine learning based techniques like abstractive summarization, extractive summarization, feature extraction and TFL (Table, Figures and Listings) summarization to extract suitable output for respective document to be created.

The administrative module 114 include a user management, an API documentation, and a server administration. The user management allows/revokes access to different users. The API documentation maintains easy to use system's documentation for users. The server administration monitors one or more server activities and associated health. The administrative module 114 is configured for administering application user management and the application/intelligence server management. The plurality of client devices module 116 is configured for facilitating user logins and interactions. The client layer 116 allows one or more users to connect application server system for further processing.

Figure 2:
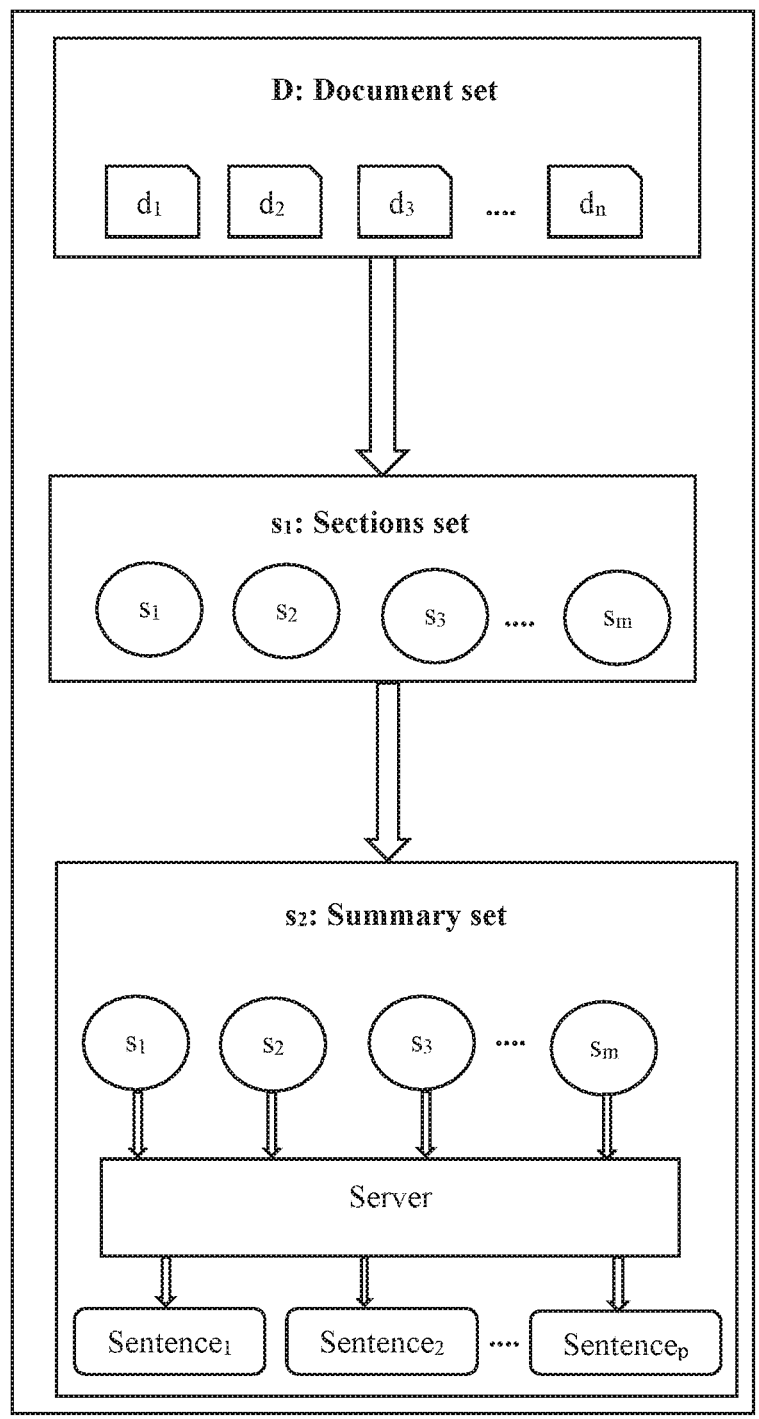
FIG. 2 is an exemplary flow diagram illustrates application flow of the medical writing automation system, according to embodiments of the present disclosure.

FIG. 2 is an exemplary flow diagram illustrates application flow of the medical writing automation system, according to embodiments of the present disclosure. In an embodiment, a user login and can select a type of document to be created. The medical writing automation system request for uploading necessary one or more input documents.

$$D \leftarrow \{d_1, d_2, d_3, \ldots d_n\}$$

In an embodiment, one or more uploaded input documents are converted into one or more sections and configured to visualize different sections of a text into one or more logical categories. For example, in case of a single document summarization, there are at least three categories viz. 'Summarizable sections' category, 'brief summaries' category and 'text sections excluded' category. The medical writing automation system propose a category of different sections through an artificial intelligence and one or more specified rules. For example, summarization of typical research paper include one or more sections such as introduction, problem statement, research methodology, experimentation, results etc. and belong to 'Summarizable sections' category, abstract, conclusion etc. and belong to 'brief summaries' category and historical background, references, appendix etc. and belong to 'text sections excluded' category. A domain expert drags and drop each section to finalize list of sections to be included in each category.

$$S_1 \leftarrow \{s_1, s_2, s_3, \ldots s_m\}$$

After finalizing categorization of suitable sections set $s_1$, summarization of text is initiated. Further, next screen is configured to display original text as well as a summary set $s_2$ of text for review.

$$S_2 \leftarrow \{sentence_1, sentence_2, sentence_3, \ldots, sentence_p\}$$

The domain expert validates the summary, if required and update the summary thereby generating final output.

Figure 3A:
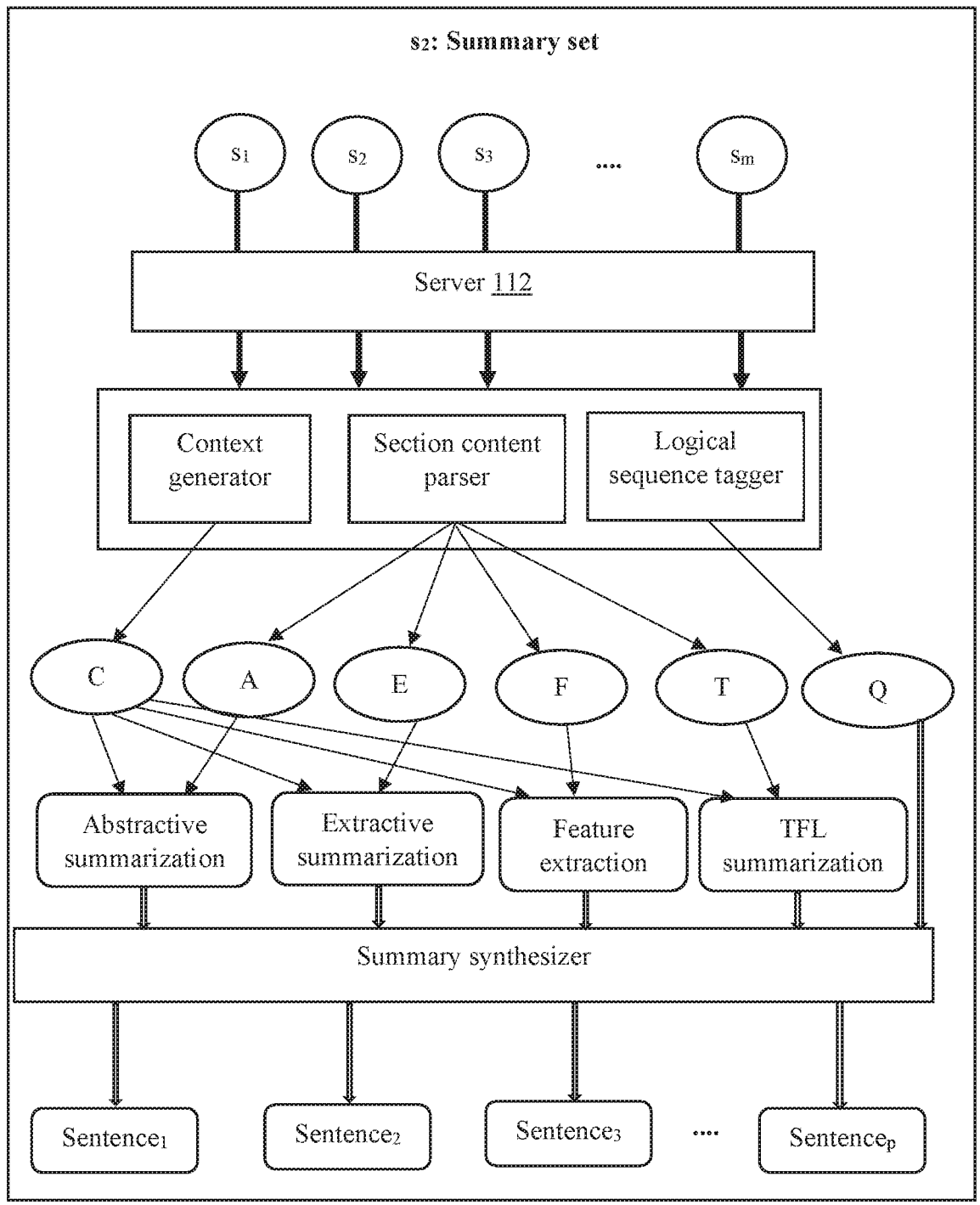
FIG. 3A and FIG. 3B are flow diagrams illustrating a process of generating summary $S_2$, according to some embodiments of the present disclosure.
Figure 3B:
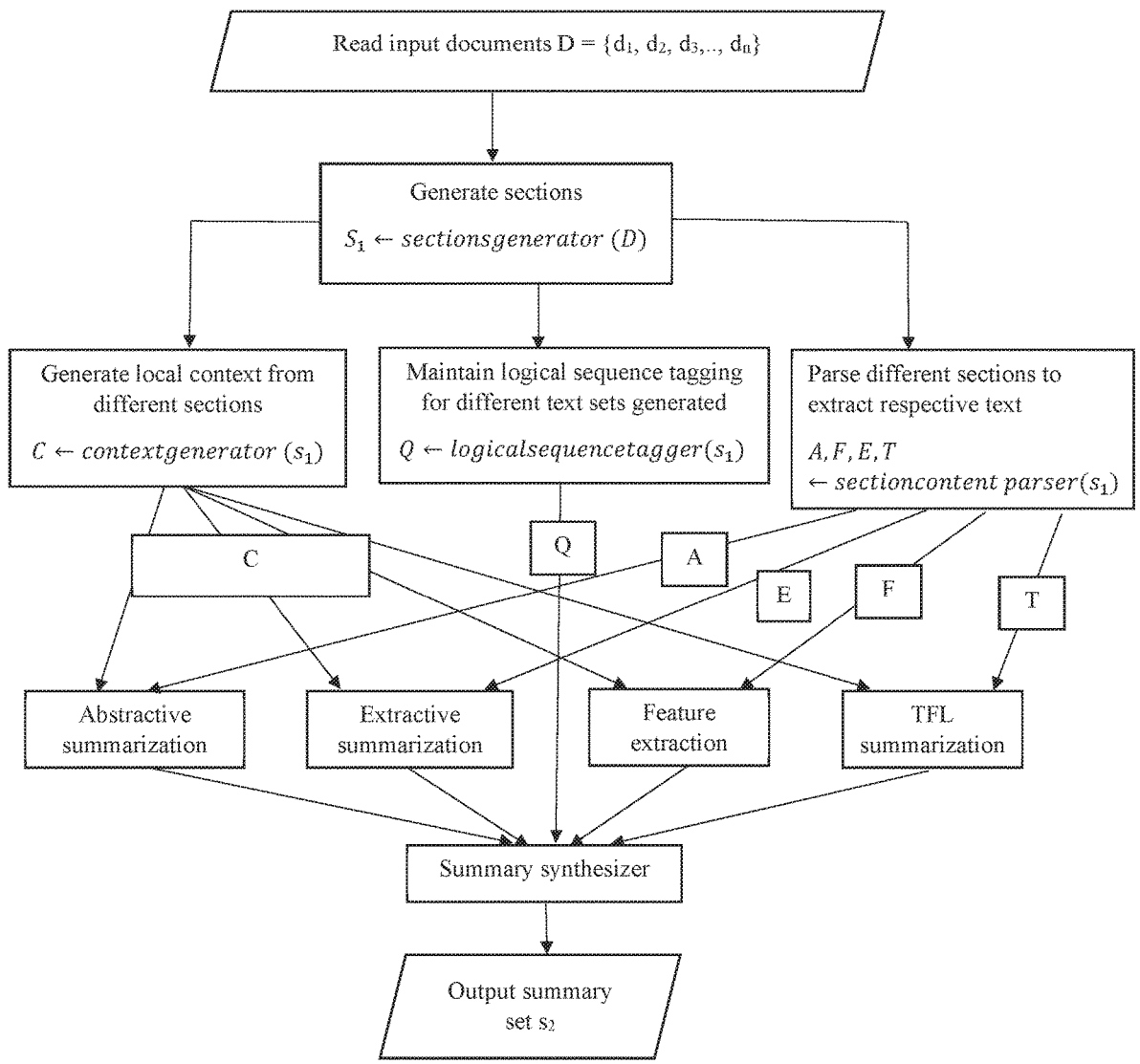

FIG. 3A and FIG. 3B are flow diagrams illustrating a process of generating summary $S_2$, according to some embodiments of the present disclosure. In an embodiment, Summarizable sections $S_1$ are passed to the server module 112, which further include at least one of (i) context generator, (ii) a section content parser, and (iii) a logical sequence tagger. The context generator is configured to create a local context of input data. The local context includes at least one of overall context of the input documents and extracted context of one or more referenced documents. The context generator is configured to emit context set 'C' for further use in summarization as well as in feature extraction. The section content parser is configured to parse different sentences of the input sections and generates at least one sequence of sentences as an output. For example, sequence 'A' includes sentence sequence for the abstractive summarization; sequence 'E' includes sentence sequence for extractive summarization; sequence 'F' includes sentence sequence for the feature extraction; and 'T' includes set of tables, figures and listings for summarization.

The logical sequence tagger is configured to create tagging information for maintaining the sequence of the input document sentences for maintaining logical sequence 'Q' in outputs. In an embodiment, sequencing of documents and their sections is logically pre-defined in the system. For example, context set 'C' is passed to all subsequent summarization and the feature extraction modules with their respective inputs received from the section content parser. In an embodiment, output of the abstractive summarization, the extractive summarization, the feature extraction, and the TFL (Table, Figures and Listings) summarization are passed to the summary synthesizer with sequence tagging 'Q' to generate the summary set $S_2$.

Figure 4A:
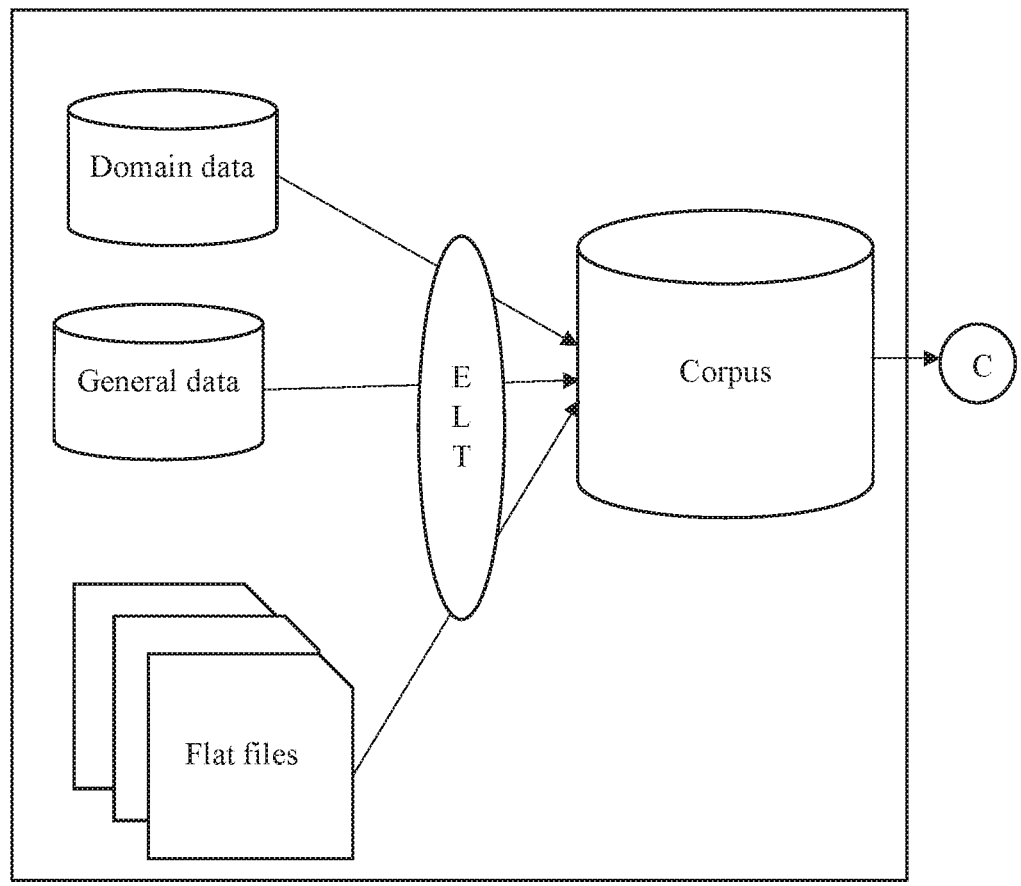
FIG. 4A and FIG. 4B are exemplary block diagrams illustrating a method of generating corpus, language model and a global context for abstractive summarization, according to some embodiments of the present disclosure.
Figure 4B:
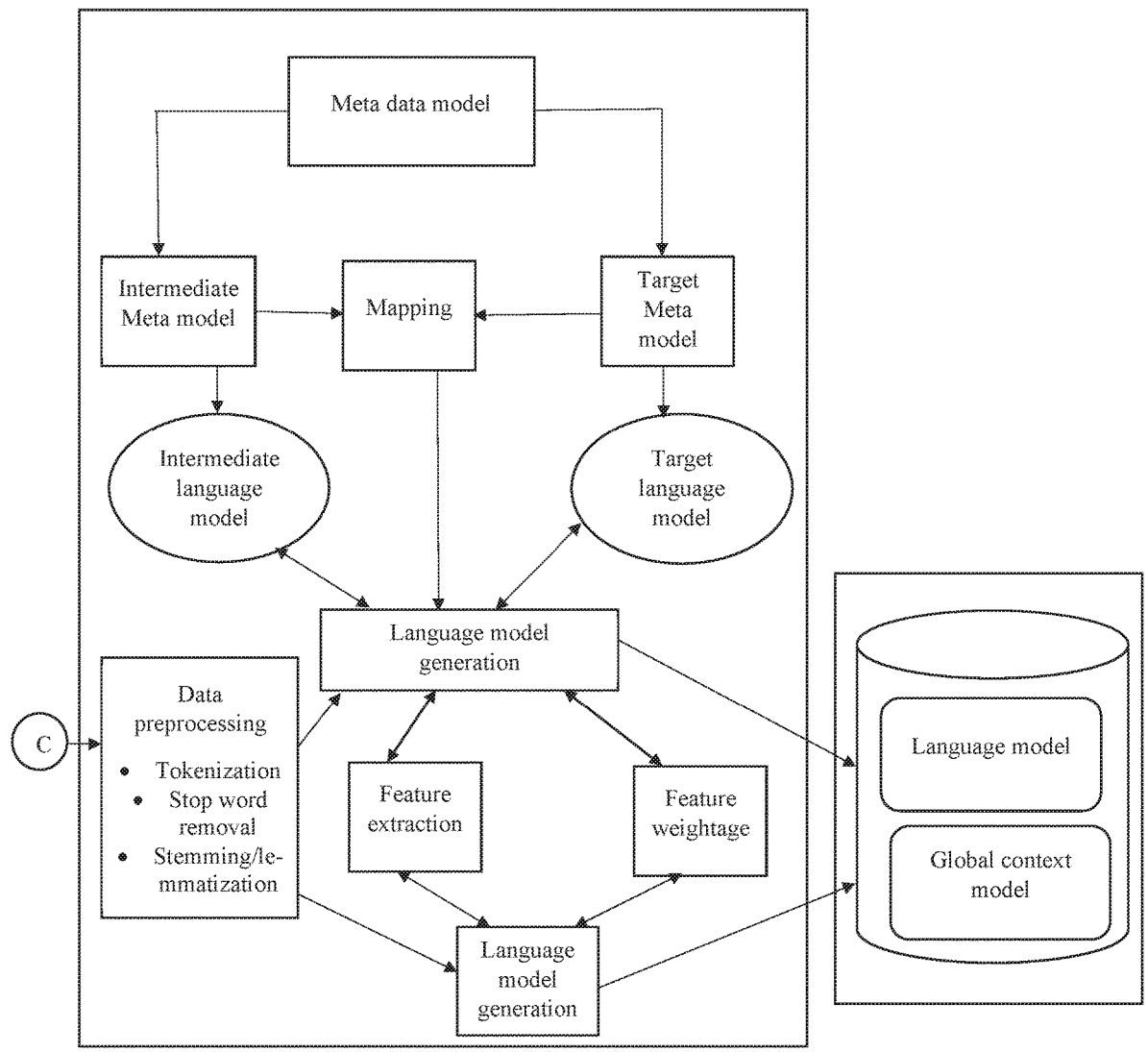

FIG. 4A and FIG. 4B are exemplary block diagrams illustrating a method of generating corpus, language model and a global context for abstractive summarization, according to some embodiments of the present disclosure. In an embodiment, the corpus is created using at least one of (i) domain data, (ii) general data, and (iii) flat file documents collected from internal/external/internet sources. In an embodiment, input data is extracted through an ELT (Extract, Load and Transform) module to create a corpus of data. The corpus is further utilized for generating the language model and the global context model. In an embodiment, a language model is generated through pre-processing of data and then further processed for creating a language and a global context model using at least one of meta-model, meta-meta-model, feature extraction and feature weightage. In an embodiment, both the language model and the global context models are used for summarization.

Figure 4C:
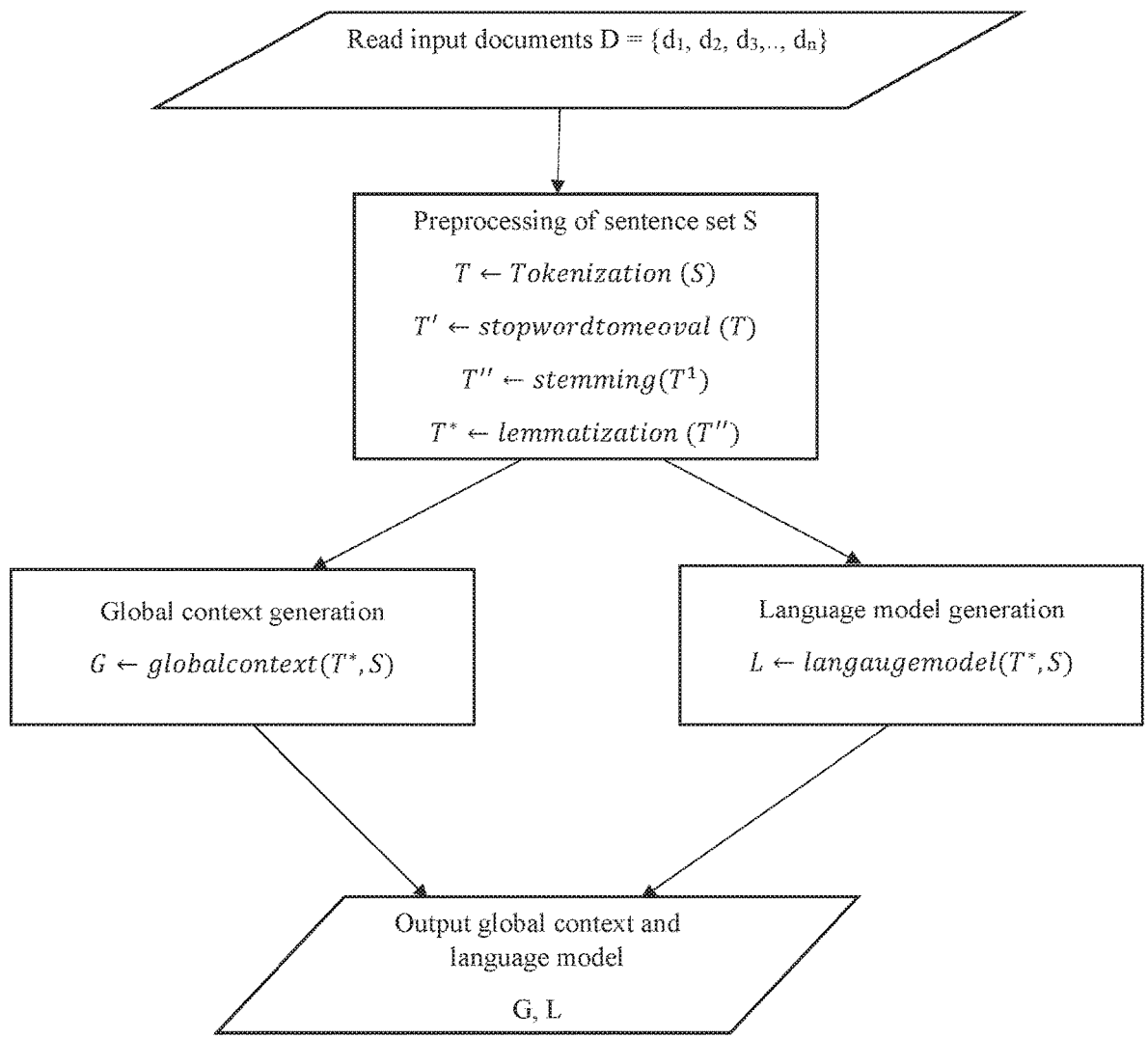
FIG. 4C is an exemplary flow diagram illustrating a method of generating corpus, language model and a global context for abstractive summarization, according to some embodiments of the present disclosure.

FIG. 4C is an exemplary flow diagram illustrating a method of generating corpus, language model and a global context for abstractive summarization, according to some embodiments of the present disclosure. In an embodiment, pre-processing of data and generation of global context set G and language model set L.

Figure 5:
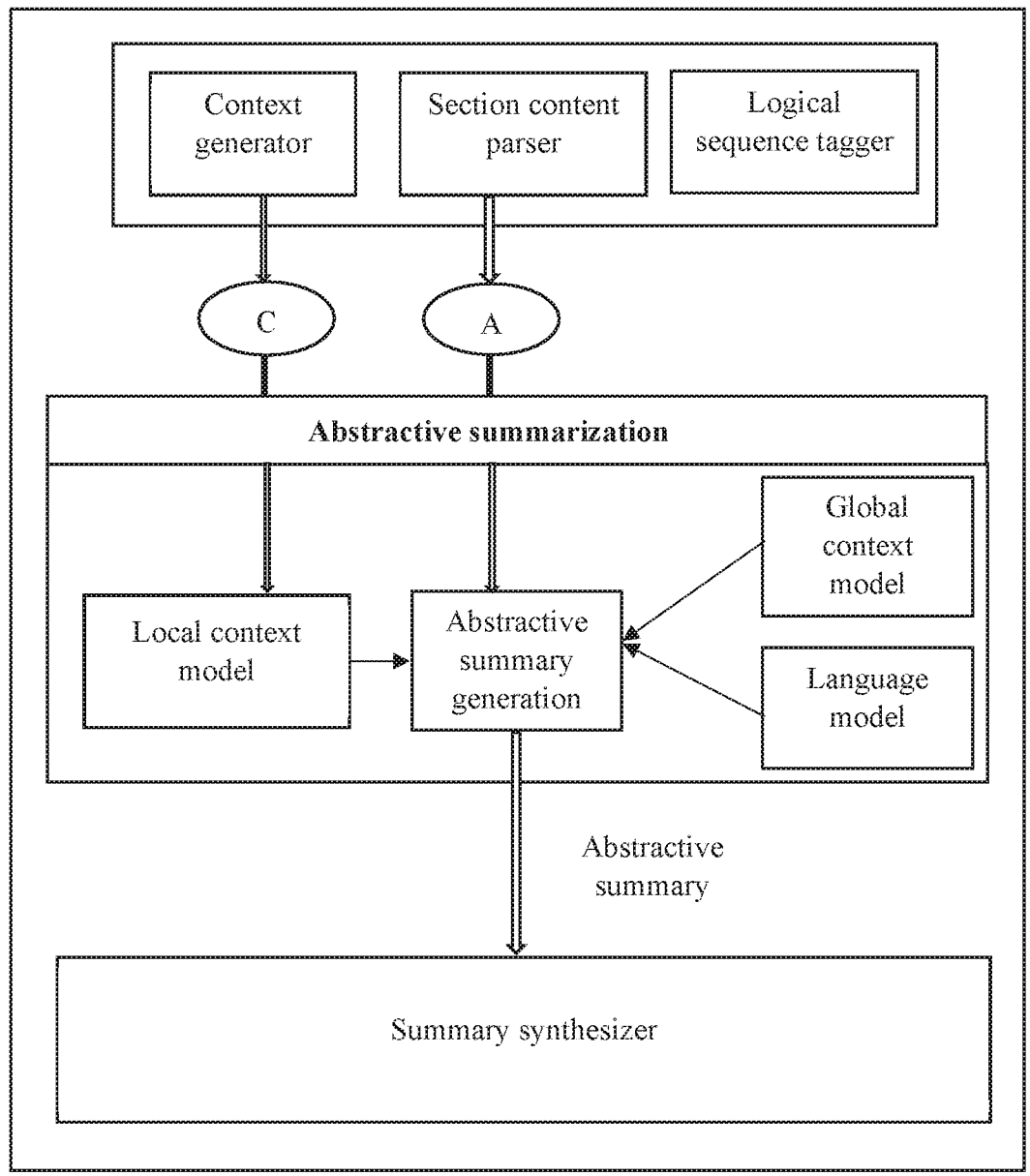
FIG. 5 is an exemplary block diagram illustrating a method of deep learning neural network based abstractive summarization using local context model and global context model, according to some embodiments of the present disclosure.

FIG. 5 is an exemplary block diagram illustrating a method of deep learning neural network based abstractive summarization using local context model and global context model, according to some embodiments of the present disclosure. In an embodiment, the abstractive summarization utilizes the generated language model and the global context model, whereas the local context model is generated through context set 'C' generated by a context generator. In an embodiment, sentence set 'A' is a subset of sentence set $S_1$ is processed to generate and an abstractive summary. The abstractive summary is then further passed to a summary synthesizer to generate combined summary set $S_2$. In an embodiment, the local context model is generated through context available in input documents in form of text and references. The global context is generated from the training corpus while generating language model.

In an exemplary embodiment, for narrative writing method, client's data is fed into the medical writing automation system in form of an excel file, out of which 'P' column's contents need to be converted into an narrative output through a feature extraction. In an exemplary embodiment, a narrative text is extracted out of unstructured text and to process the data through the feature extraction by a natural language processing using a context of text and a logical sequencing of inputs.

In another exemplary embodiment, a single document summarization, a user of the medical writing automation system upload a portable document format (PDF) document and sections of document is extracted and display the sections that are stored in a JavaScript object notation (JSON) format. For example, the sections are shown into Summarizable/brief summaries/text section excluded. A domain expert may override machine's artificial intelligence to include/exclude sections of text. After domain expert's review, a summary is generated from the medical writing automation system.

Figure 6:
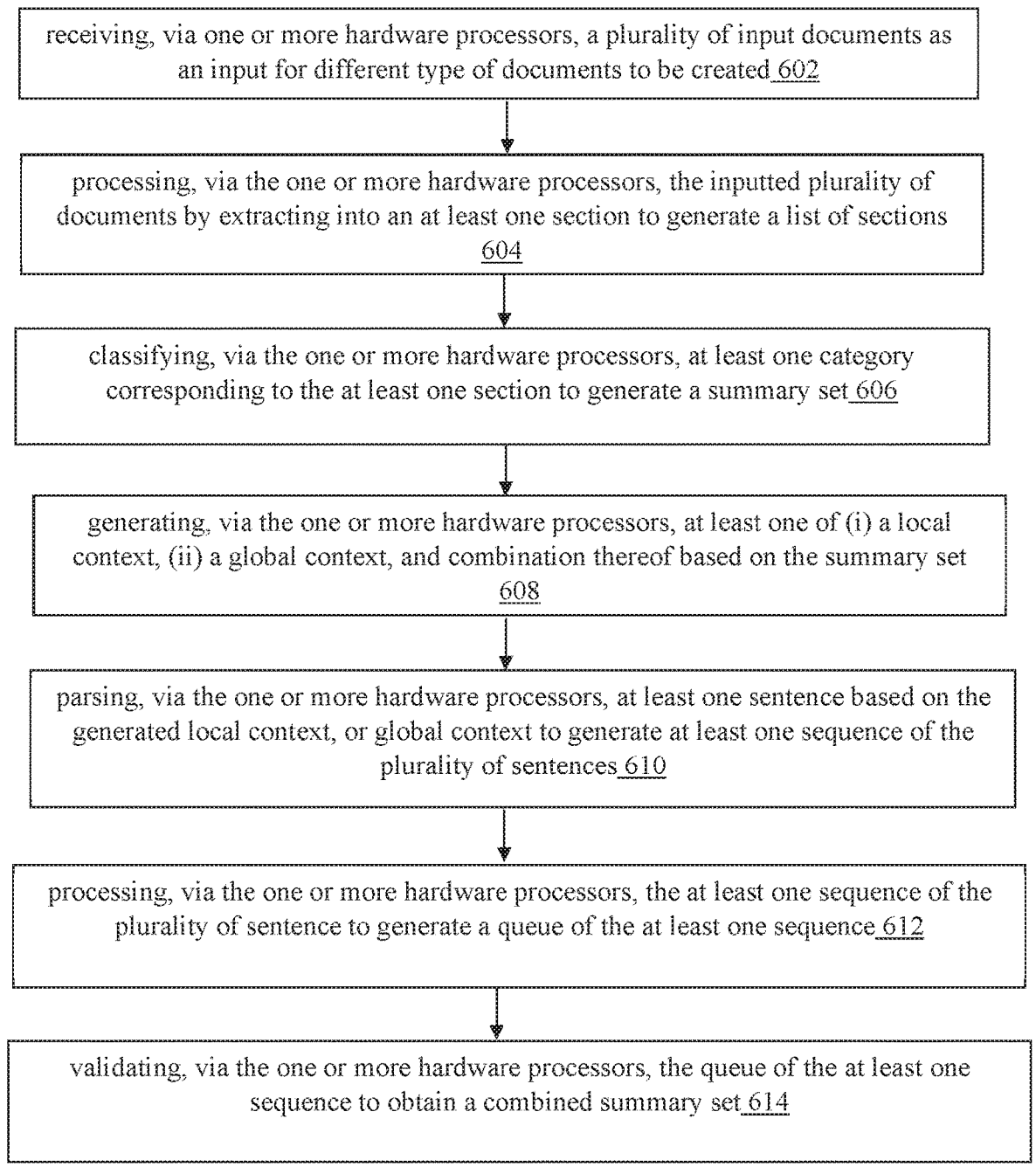
FIG. 6 is an exemplary flow diagram illustrating a method of an automatic medical document writing, using the system of FIG. 1B, according to some embodiments of the present disclosure.

FIG. 6 is an exemplary flow diagram illustrating a method of an automatic medical document writing, using the system of FIG. 2, according to some embodiments of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted is better understood by way of following explanation/description. The steps of the method of the present disclosure will now be explained with reference to the components of the system 100 as depicted in FIG. 1B.

At step 602, a plurality of input documents is received as an input for different type of documents to be created. At step 604, the inputted plurality of documents is processed by extracting into an at least one section to generate a list of sections. At step 606, at least one category corresponding to the at least one section is classified to generate a summary set. In an embodiment, the at least one category corresponds to a Summarizable category. In an embodiment, the summary set comprises a plurality of sentences. At step 608, at least one of (i) a local context, (ii) a global context, and combination thereof is generated based on the summary set. At step 610, at least one sentence is parsed based on the generated local context, or global context to generate at least one sequence of the plurality of sentences. At step 612, the at least one sequence of the plurality of sentence is processed to generate a queue of the at least one sequence. At step 614, the queue of the at least one sequence is validated to obtain a combined summary set.

In an embodiment, the plurality of logical categories corresponds to at least one of (i) a Summarizable sections, (ii) brief summaries, and (iii) text sections excluded. In an embodiment, the Summarizable Sections category include at least one section of (i) introduction, (ii) problem statement, (iii) research methodology, and (iv) experimentation with associated results. In an embodiment, the brief summaries category includes at least one section of (i) abstract, and (ii) conclusion. In an embodiment, the text sections excluded category include at least one section of (i) historical background, (ii) references, and (iii) appendix. In an embodiment, the local context include at least one of (i) overall context of the input documents, (ii) an extracted context of a plurality of referenced documents or combination thereof.

The embodiments of the present disclosure in which the medical writing automation system may not replace medical writers, but support medical writer(s) to create, update, and maintain documents faster, ease, and with requisite quality. The embodiments of the present disclosure facilitate the medical writers to focus on scientifically valuable activities such as data interpretation. The embodiments of the present disclosure support in creating summaries of medical documents to facilitate ease to understand the content briefly.

The process of extracting information from different documentation formats, cleansing of data, section by section complex processing of data to generate human readable natural language sentences and producing output that meets benchmark quality standards as well as regulatory compliance. The embodiments of the present disclosure is capable enough in terms of extensibility, flexibility and adaptability. The embodiments of the present disclosure further facilitate speeding up of new drug development process by reducing cost and document creation time.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method of a machine assisted documentation in a medical writing, comprising:

receiving, via one or more hardware processors, a plurality of input documents as an input for different type of documents to be created;

processing, via the one or more hardware processors, the inputted plurality of documents by extracting into an at least one section to generate a list of sections, wherein the sections are processed based on a natural language processing;

classifying, via the one or more hardware processors, at least one category from a plurality of categories corresponding to the at least one section to generate a summary set, wherein the at least one category corresponds to a Summarizable category, wherein the summary set comprises a plurality of sentences;

generating, via the one or more hardware processors, at least one of (i) a local context, (ii) a global context, and combination thereof based on the summary set, wherein a knowledge base is utilized for the local context and the global context for processing a plurality of natural language inputs;

parsing, via the one or more hardware processors, at least one sentence based on the generated local context, or global context to generate at least one sequence of the plurality of sentences, wherein sequencing of the plurality of documents and the sections is pre-defined;

processing, via the one or more hardware processors, the at least one sequence of the plurality of sentences to generate a queue of the at least one sequence; and validating, via the one or more hardware processors, the queue of the at least one sequence to obtain a combined summary set, wherein validation is based on abstractive summarization, extractive summarization, feature extraction and Table, Figures and Listings (TFL) summarization to extract output for respective document and generate the summary, wherein generating the summary includes at least one of (i) a context generator, (ii) a section content parser, and (iii) a logical sequence tagger, wherein the context generator is configured to create the local context of input data;

generating a context set for use in summarization and the feature extraction;

creating tagging information for maintaining the sequence of plurality of input document sequences for maintaining logical sequence and wherein the generated summary is validated and updated by generating a final output.

2. The processor implemented method of claim 1, wherein the plurality of logical categories corresponds to at least one of (i) a Summarizable sections, (ii) brief summaries, and (iii) text sections excluded.

3. The processor implemented method of claim 1, wherein the Summarizable Sections category comprises at least one section of (i) introduction, (ii) problem statement, (iii) research methodology, and (iv) experimentation with associated results.

4. The processor implemented method of claim 1, wherein the brief summaries category comprises at least one section of (i) abstract, and (ii) conclusion, wherein the text sections excluded category comprises at least one section of (i) historical background, (ii) references, and (iii) appendix.

5. The processor implemented method of claim 1, wherein the local context comprises at least one of (i) overall context of the input documents, (ii) an extracted context of a plurality of referenced documents or combination thereof.

6. A system (100) for a machine assisted documentation in a medical writing, comprising:
  a memory (102) storing instructions;
  one or more communication interfaces (106); and
  one or more hardware processors (104) coupled to the memory (102) via the one or more communication interfaces (106), wherein the one or more hardware processors (104) are configured by the instructions to:
    receive, a plurality of input documents as an input for different type of documents to be created;
    process, the inputted plurality of documents by extracting into an at least one section to generate a list of sections, wherein the sections are processed based on a natural language processing;
    classify, at least one category from a plurality of categories corresponding to the at least one section to generate a summary set, wherein the at least one category corresponds to a Summarizable category, wherein the summary set comprises a plurality of sentences;
    generate, at least one of (i) a local context, (ii) a global context, and combination thereof based on the summary set, wherein a knowledge base is utilized for the local context and the global context for processing a plurality of natural language inputs;
    parse, at least one sentence based on the generated local context, or global context to generate at least one sequence of the plurality of sentences, wherein sequencing of the plurality of documents and the sections is pre-defined;
    process, the at least one sequence of the plurality of sentences to generate a queue of the at least one sequence; and
    validate, the queue of the at least one sequence to obtain a combined summary set, wherein validation is based on abstractive summarization, extractive summarization, feature extraction and Table, Figures and Listings (TFL) summarization to extract output for respective document and generate the summary, wherein generating the summary includes at least one of (i) a context generator, (ii) a section content parser, and (iii) a logical sequence tagger, wherein the context generator is configured to create the local context of input data, wherein the context generator is configured to generate a context set for use in summarization and the feature extraction, wherein the logical sequence tagger is configured to create tagging information for maintaining the sequence of plurality of input document sequences for maintaining logical sequence and wherein the generated summary is validated and updated by generating a final output.

7. The system of claim 6, wherein the plurality of logical categories corresponds to at least one of (i) a Summarizable sections, (ii) brief summaries, and (iii) Text sections excluded.

8. The system of claim 6, wherein the Summarizable Sections category comprises at least one section of (i) introduction, (ii) problem statement, (iii) research methodology, and (iv) experimentation with associated results.

9. The system of claim 6, wherein the brief summaries category comprises at least one section of (i) abstract, and (ii) conclusion, wherein the text sections excluded category comprises at least one section of (i) historical background, (ii) references, and (iii) appendix.

10. The system of claim 6, wherein the local context comprises at least one of (i) overall context of the input documents, (ii) an extracted context of a plurality of referenced documents or combination thereof.

11. One or more non-transitory machine-readable information storage mediums comprising one or more instructions which when executed by one or more hardware processors perform actions comprising:
  receiving, a plurality of input documents as an input for different type of documents to be created;
  processing, the inputted plurality of documents by extracting into an at least one section to generate a list of sections, wherein the sections are processed based on a natural language processing;
  classifying, at least one category from a plurality of categories corresponding to the at least one section to generate a summary set, wherein the at least one category corresponds to a Summarizable category, wherein the summary set comprises a plurality of sentences;
  generating, at least one of (i) a local context, (ii) a global context, and combination thereof based on the summary set, wherein a knowledge base is utilized for the local context and the global context for processing a plurality of natural language inputs;
  parsing, at least one sentence based on the generated local context, or global context to generate at least one sequence of the plurality of sentences, wherein sequencing of the plurality of documents and the sections is pre-defined;
  processing, the at least one sequence of the plurality of sentences to generate a queue of the at least one sequence; and
  validating, the queue of the at least one sequence to obtain a combined summary set, wherein validation is based on abstractive summarization, extractive summarization, feature extraction and Table, Figures and Listings (TFL) summarization to extract output for respective document and generate the summary, wherein generating the summary includes at least one of (i) a context generator, (ii) a section content parser, and (iii) a logical sequence tagger, wherein the context generator is configured to create the local context of input data;
  generating a context set for use in summarization and the feature extraction;
  creating tagging information for maintaining the sequence of plurality of input document sequences for maintaining logical sequence and wherein the generated summary is validated and updated by generating a final output.

12. The one or more non-transitory machine-readable information storage mediums of claim 11, wherein the plurality of logical categories corresponds to at least one of (i) a Summarizable sections, (ii) brief summaries, and (iii) text sections excluded.

13. The one or more non-transitory machine-readable information storage mediums of claim 11, wherein the Summarizable Sections category comprises at least one section of (i) introduction, (ii) problem statement, (iii) research methodology, and (iv) experimentation with associated results.

14. The one or more non-transitory machine-readable information storage mediums of claim 11, wherein the brief summaries category comprises at least one section of (i) abstract, and (ii) conclusion, wherein the text sections excluded category comprises at least one section of (i) historical background, (ii) references, and (iii) appendix.

15. The one or more non-transitory machine-readable information storage mediums of claim 11, wherein the local context comprises at least one of (i) overall context of the input documents, (ii) an extracted context of a plurality of referenced documents or combination thereof.

* * * * *